UNITED STATES PATENT OFFICE.

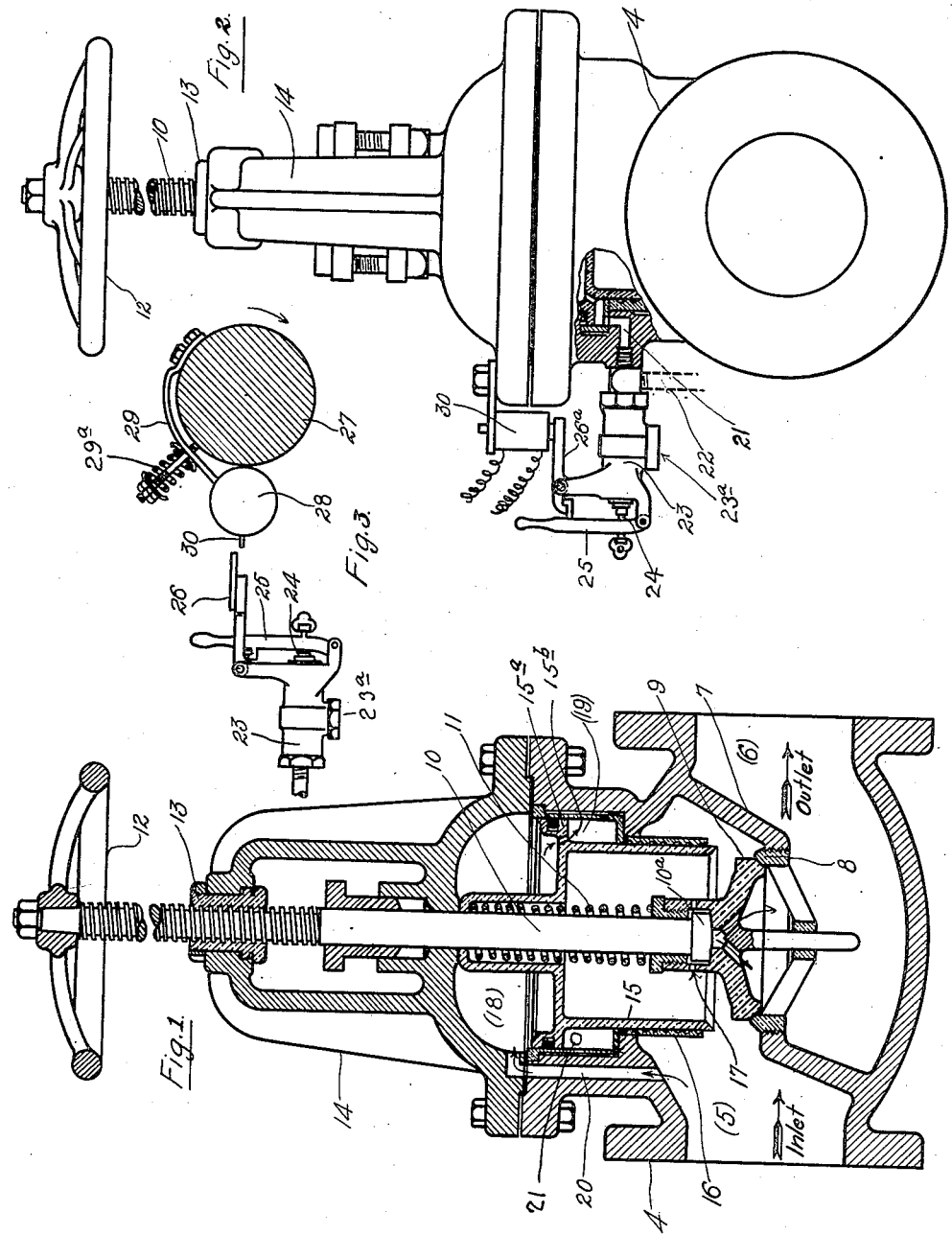

EDWARD V. ANDERSON, OF MONESSON, PENNSYLVANIA, ASSIGNOR OF ONE-HALF TO CHARLES E. GOLDEN, OF CRAFTON, PENNSYLVANIA.

AUTOMATIC VALVE.

1,077,503.  Specification of Letters Patent.  Patented Nov. 4, 1913.

Application filed October 18, 1911. Serial No. 655,434.

*To all whom it may concern:*

Be it known that I, EDWARD V. ANDERSON, a citizen of the United States, residing at Monesson, in the State of Pennsylvania, have invented a certain new and useful Automatic Valve, of which the following is a specification.

My invention relates generally to throttle valves, and more especially to valves arranged to automatically close by disturbing the equilibrium of pressure existing in its normal open condition, and its primary object is to produce an automatic self closing valve operable over a distance by release of pressure, to provide an easy opening and self closing valve, and to generally improve the construction and operation of valves.

In the accompanying drawing Figure 1 is a central vertical section of the valve and Fig. 2 is an end elevation of the same and of the exhaust or pilot valve device, the view being partly in section. Fig. 3 represents the section of an engine shaft and the relative location of the pilot valve for certain purposes.

Heretofore it has been customary to handle throttle valves either by hand, or else by a governor of an engine which gradually closes the valve, whereas my invention provides means for automatically closing the valve when the speed of the engine exceeds a certain desired limit and meantime leaves the valve opening free. Also it has been customary heretofore to use, for throttling, the main valve itself, whereas I provide a quick acting auxiliary throttle device separate from the main valve. Incidentally, I provide means for operating the throttle valve either by air pressure or electricity from any distance desired and attain other advantages hereinafter set forth.

Thus in the drawing, I show for illustration a throttle valve for steam engines. The valve casing 4 has an inlet (5) and an outlet (6) on the two sides of a separating web 7 which has a seating ring 8 with two valve seating surfaces. The main valve 9 seats on the inner conical surface of 8, and is carried loosely on a stem 10 by head 10ª, normally held in downward position against spring 11, and operated by handwheel 12, being provided with a screw passing through the nut 13 in the hood 14. At the same time the spring 11 holds in normal raised position the supplementary valve 15 which fits snugly in a jacket 16 and in raised position uncovers the small port 17, which however is prevented from communication with the outlet side of the main valve by the head 10ª of the valve stem. The auxiliary valve 15 is provided with an enlarged flange 15ª riding in an enlargement of the jacket 16, so that together the two provide a space or chamber 19 under the flange 15ª. This chamber communicates through port 15ᵇ with the chamber 18 in the head and this chamber communicates by passage 20 with the inlet side of the valve. Normally the valve in closed position is as shown in Fig. 1. Upon opening it the first action is to lift the head 10ª on the spindle and allow leakage through the port 17 to the outlet side so as to make it easier to open the valve against the line pressure. As the main valve 9 is opened, the stem rising with the spring 11 raises the auxiliary valve 15 to the position shown. In this position of course the head or flange 15ª has line pressure equalized on the two sides by reason of the ports 20 and 15ᵇ, so that the auxiliary valve 15 is held up by the spring. This valve 15 is adapted to seat on the outside conical surface of the seating ring 8 and in case of emergency it may be quickly closed by exhausting the pressure in chamber 19 by way of port 21, which is shown more clearly in Fig. 2.

I have shown a convenient means for exhausting the chamber 19, by small pilot valve 23 connected to the port 21 and being allowed to open to the air at 23ª whenever its stem 24 is released by the lever 25 by raising the trip 26. This may be either done by hand or as here shown in several ways automatically. In Fig. 3 the engine shaft 27, revolving in the direction of the arrow carries a weight 28 on a spring arm 29, whose strength may be regulated by spring 29ª, and when the centrifugal force changes the position of the weight the pin 30 will strike the tripping dog 26 and release the lever 25. This allows the engine to be free to the ordinary government and a throttle valve operated only when a certain desired speed is exceeded. In the form of Fig. 2, I show the retaining arm 26ª arranged to be moved downwardly upon exciting the solenoid 30 by making the circuit at any convenient point at a distance, either by hand or automatically. Of course when the pilot valve is opened, the pressure escapes from the chamber 19 and the auxiliary valve closes on its conical seat. In doing so it, in conjunction with the main valve, entraps fluid within its chamber and furnishes a cushion so that the valve cannot close too suddenly.

Having thus described my invention and illustrated its use, what I claim is the following:

A quick operating emergency valve comprising a casing having a double valve seat, a main and a supplementary valve engaging said seat and also engaging each other to form a cushion on closing the supplemental valve, means to normally maintain the supplemental valve under balanced pressure, a spring to support the weight of the supplemental valve on the main valve, a port adapted to control fluid pressure to close the supplemental valve, a pilot valve controlling said port, and electrical devices operable from a distance to trip said pilot valve in case of emergency.

In testimony whereof I have hereunto signed my name in the presence of the two subscribed witnesses.

EDWARD V. ANDERSON.

Witnesses:
 FREDK. STAUB,
 JO. BAILY BROWN.